(12) United States Patent
Slocum

(10) Patent No.: US 7,901,169 B2
(45) Date of Patent: Mar. 8, 2011

(54) TIE DOWN DEVICE FOR SECURING VEHICLES WITH HANDLEBARS FOR TRANSPORT

(76) Inventor: Jonathan C. Slocum, Lagrangeville, NY (US)

( * ) Notice: Subject to any disclaimer, the term of this patent is extended or adjusted under 35 U.S.C. 154(b) by 92 days.

(21) Appl. No.: 12/401,798

(22) Filed: Mar. 11, 2009

(65) Prior Publication Data

US 2010/0232900 A1 Sep. 16, 2010

(51) Int. Cl.
*B60P 7/08* (2006.01)
(52) U.S. Cl. .................................. 410/97; 410/3; 410/23
(58) Field of Classification Search .................. 410/2, 3, 410/10, 11, 23, 96, 97; 224/402, 403, 412, 224/413, 924; 24/265 CD
See application file for complete search history.

(56) References Cited

U.S. PATENT DOCUMENTS

| | | | | |
|---|---|---|---|---|
| 1,735,212 A | * | 11/1929 | Pawsat | 248/229.24 |
| 5,373,978 A | * | 12/1994 | Buttchen et al. | 224/510 |
| 6,171,034 B1 | * | 1/2001 | Burgoon et al. | 410/3 |
| 6,705,811 B1 | * | 3/2004 | Selby | 410/3 |
| 6,715,972 B2 | | 4/2004 | Jackson, Sr. | |
| 6,932,550 B1 | | 8/2005 | Hope | |
| 7,322,780 B2 | * | 1/2008 | Hill | 410/97 |
| 2006/0186162 A1 | | 8/2006 | Stubbs | |

* cited by examiner

*Primary Examiner* — Stephen Gordon
(74) *Attorney, Agent, or Firm* — Law Offices of Michael L. Wise, LLC

(57) ABSTRACT

A vehicle having a handlebar grip comprising a cylindrical surface is secured for transport with a tie-down strap using an apparatus. The apparatus comprises a series of two or more rigid plates flexibly connected at their edges. The series is adapted to be applied to the handlebar grip such that the two or more rigid plates overlie respective portions of the cylindrical surface while, at the same time, the first and last rigid plates in the series define an uncovered region of the cylindrical surface therebetween.

13 Claims, 3 Drawing Sheets

TIE DOWN DEVICE FOR SECURING VEHICLES WITH HANDLEBARS FOR TRANSPORT

FIELD OF THE INVENTION

The present invention relates generally to vehicles having handlebars for steering, and, more particularly, to devices for securing these types of vehicles with tie-down straps for transport.

BACKGROUND OF THE INVENTION

There are several types of vehicles that utilize handlebars for steering. These "handlebar-steered vehicles" (HSVs) include, but are not limited to, motorcycles, trikes (i.e., three-wheeled motorcycles), bicycles, jet skis, snowmobile, and all-terrain vehicles (ATVs). Because of the nature of these vehicles, it is frequently necessary to transport these vehicles on another vehicle (e.g., on a truck) or behind another vehicle (e.g., on a trailer). In doing so, it is critical that the transported vehicle be properly secured. If it is not, the transported vehicle may work itself loose and, in doing so, may incur damage or, even worse, cause injury to the life or property of others.

HSVs comprise grips at each end of their handlebars. These handlebar grips usually include a cylindrical surface of rubber around which the rider wraps his or her hands during operation of the vehicle. The compressible and tacky nature of the rubber helps in providing the rider with good purchase on the controls, even when the controls are wet. In doing so, the rubber handlebar grips afford the rider of the HSV with increased safety and comfort.

Nevertheless, these same rubber handlebar grips can be easily damaged when trying to secure an HSV for transport. In securing an HSV for transport, tie down straps (e.g., strong fabric straps) are usually spanned between the vehicle and the transporting vehicle or trailer and then tensioned so as to place a downward force on the HSV. For safety, this downward tension must typically be great enough to actually compress the suspension of the transported vehicle. Nevertheless, many HSVs do not have frame parts onto which tie-down straps may be conveniently attached. For example, many modern motorcycles have aerodynamic fairing bodywork that covers a majority of the frame of the motorcycle. As a result, the grips of the handlebars become the only remaining frontal portion of the HSV onto which the tie-down straps may be conveniently attached. Unfortunately, the cinching of the tie-down straps around the handlebar grips can easily cause substantial damage to these components. Moreover, if not cinched tightly enough, the tie-down straps may actually slide or "walk" off of the grips and extensively damage those components that are located proximate to these handles (e.g., mirrors, brake and clutch levers, hydraulic fluid reservoirs, and electrical switches) or even allow the HSV to come loose.

For the foregoing reasons, there is a need for device that allows a tie-down strap to be securely attached to the handlebar grips of an HSV while minimizing any damage to that vehicle.

SUMMARY OF THE INVENTION

Embodiments of the present invention address the above-identified need by providing an apparatus for securely attaching a tie-down strap to the handlebar grip of an HSV.

In accordance with an aspect of the invention, a vehicle having a handlebar grip comprising a cylindrical surface is secured for transport with a tie-down strap using an apparatus. The apparatus comprises a series of two or more rigid plates flexibly connected at their edges. The series is adapted to be applied to the handlebar grip such that the two or more rigid plates overlie respective portions of the cylindrical surface while, at the same time, the first and last rigid plates in the series define an uncovered region of the cylindrical surface therebetween.

In accordance with another aspect of the invention, a vehicle having a handlebar grip comprising a cylindrical surface is secured for transport with a tie-down strap using an apparatus. The apparatus comprises two or more rigid plates. These rigid plates are adapted to be applied to the handlebar grip such that each of the two or more rigid plates overlies a respective portion of the cylindrical surface while, at the same time, at least a pair of the two or more rigid plates defines an uncovered region of the cylindrical surface therebetween.

In accordance with one of the above-identified embodiments of the invention, a securing apparatus comprises two rigid plates connected at their edges by a flexible connector. When applied to the cylindrical surface of a handlebar grip of a motorcycle, these two rigid plates overlie a majority of the cylindrical surface but also define a gap between the plates. The tightening of a tie-down strap around the securing apparatus causes it to constrict around the handlebar grip. Ridges on the rigid plates restrict the tie-down strap from moving laterally on the securing apparatus.

Advantageously, the above-identified embodiments of the invention provide an apparatus for securely attaching a tie-down strap to the handlebar grips of an HSV while minimizing any damage to that vehicle.

These and other features and advantages of the present invention will become apparent from the following detailed description which is to be read in conjunction with the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
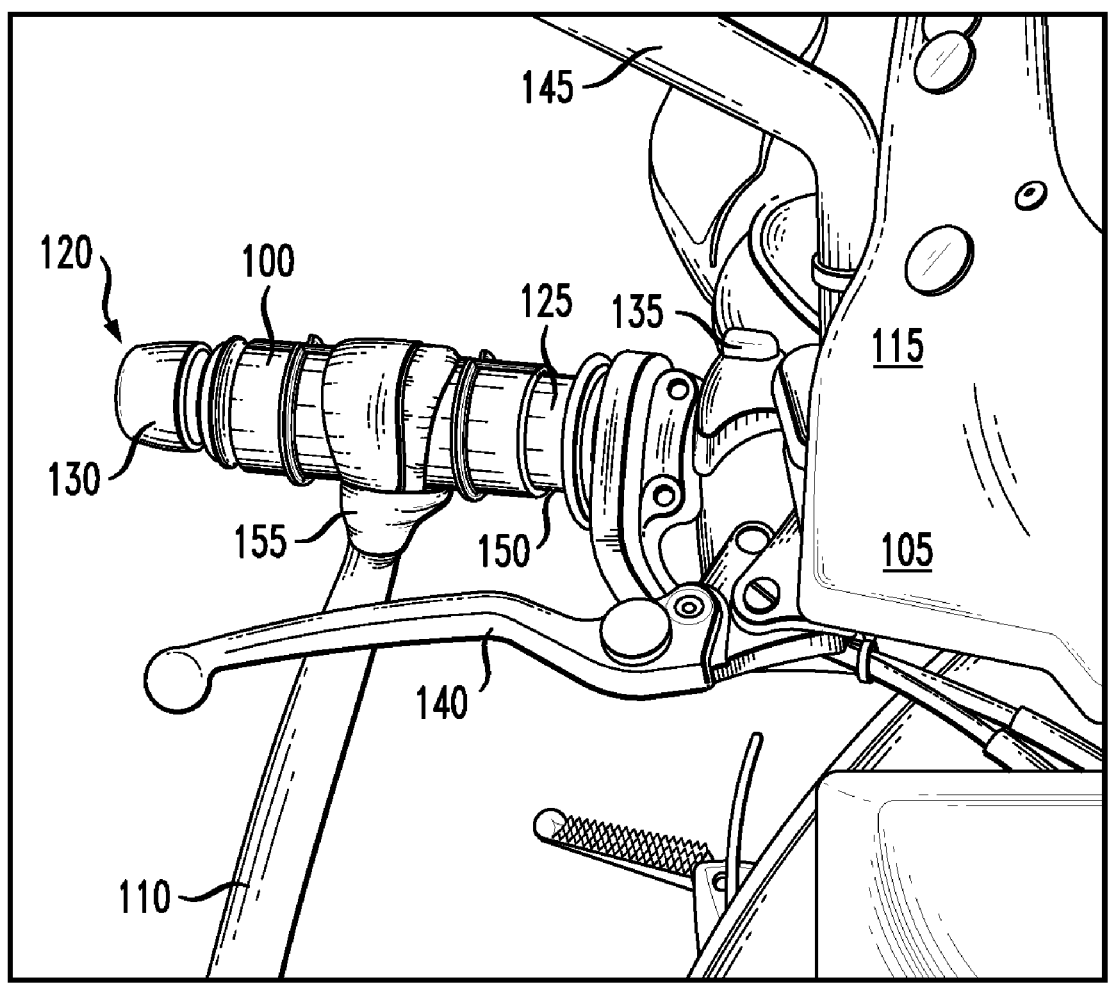
FIG. 1 shows a perspective view of a securing apparatus, tie-down strap, and motorcycle, wherein the securing apparatus is in accordance with a first illustrative embodiment of the invention.

FIG. 1 shows a perspective view of a securing apparatus 100 in accordance with a first illustrative embodiment of the invention in combination with a motorcycle 105 (i.e. a form of HSV) and a tie-down strap 110. The securing apparatus, motorcycle, and tie-down strap are configured as they might be if the motorcycle were secured to a truck or trailer for transport.

The motorcycle 105 in FIG. 1 is conventional. It contains a body 115 to which is connected a handlebar 120. The handlebar, in turn, includes a handlebar grip 125, handlebar end weight 130, various electrical switches 135, and a brake lever 140. A stock 145 extends from the handlebar to which a mirror (not shown) is mounted. The handlebar grip itself comprises a cylindrical surface 150 around which a rider places his or her hands while operating the vehicle. This cylindrical surface comprises compressible rubber to help in providing the rider with improved purchase on the controls.

As can be seen in FIG. 1, the securing apparatus 100 acts as an interface between the handlebar grip 125 and the tie-down strap 110. In doing so, the securing apparatus covers the majority of the cylindrical surface 150 of the handlebar grip. The end of the tie-down strap encircles the securing apparatus with a slip-type knot 155 which is facilitated by a twisted loop (or "eye") in the tie-down strap. When drawn away from the handlebar grip, the slip-type knot constricts against the securing apparatus and causes the securing apparatus to tighten around (i.e., cinch down on) the handlebar grip.

FIGS. 2A-2E provide additional views of the illustrative securing apparatus 100. For purposes of illustrating aspects of the invention, the securing apparatus in FIGS. 2A-2E is positioned as it might appear if it were attached to the handlebar grip 125 (as shown in FIG. 1). In accordance with aspects of the invention, the securing apparatus comprises a series of two rigid plates 160 that are flexibly connected at their edges by a flexible connector 165. Two ridges 170 are equally spaced about the center of each of the rigid plates and run substantially parallel with one another.

When applied to the handlebar grip 125 as shown in FIG. 1, the rigid plates 160 overlie respective portions of the cylindrical surface 150. In order to accomplish this, the two rigid plates are curved so that they substantially follow the contour of this surface. Many conventional handlebar grips have a radius of between about 0.5 inches and about 0.7 inches. Designing the rigid plates of the securing apparatus with a radius of curvature of about the same values has, as a result, been found to provide good contact between the rigid plates and the handlebar grips. Notably, the edges 175 of the two rigid plates that are opposite to the flexible connector 165 do not meet each other when the securing device is applied to the handlebar grip. Instead, they define a gap 180 comprising an uncovered region of the cylindrical surface (i.e., a region of the cylindrical surface not directly contacted by any portion of the securing apparatus) between the two rigid plates. The purpose of the gap is to give the securing apparatus room to constrict around the cylindrical surface of the handlebar grip. If, instead of defining the gap, these edges were to abut one another, the compression of the securing apparatus around the handlebar grip might be restricted. This restriction, in turn, might cause the securing apparatus to deform or break when a tie-down strap is tightened around it.

Figure 2A:
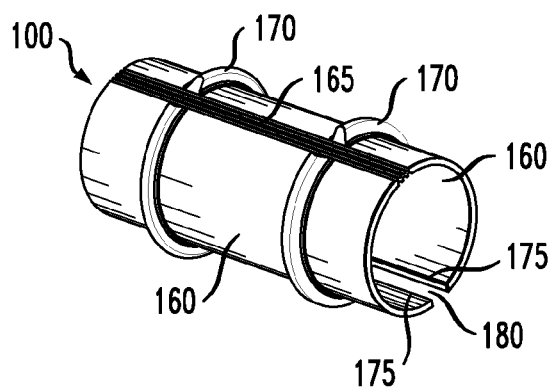
FIGS. 2A and 2B show perspective views of the FIG. 1 securing apparatus.
Figure 2B:
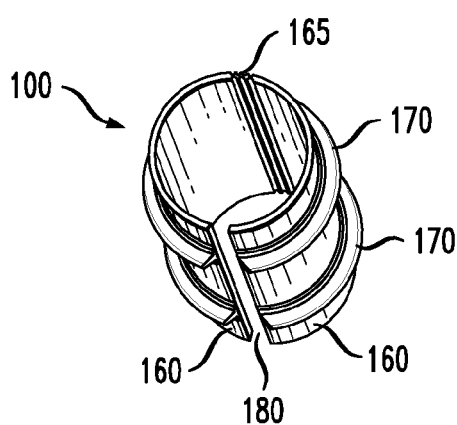
Figure 2C:
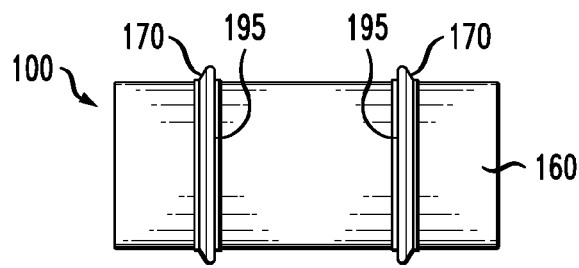
FIGS. 2C and 2D show side views of the FIG. 1 securing apparatus.
Figure 2D:
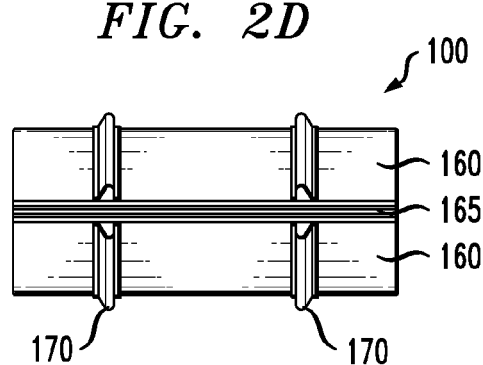
Figure 2E:
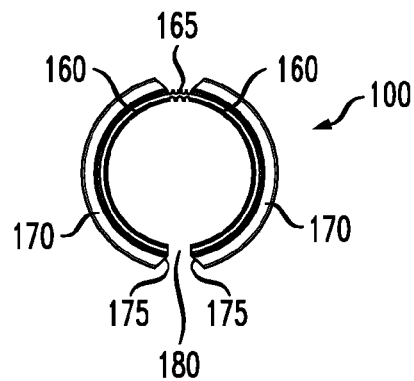
FIG. 2E shows an end view of the FIG. 1 securing apparatus.
Figure 2F:
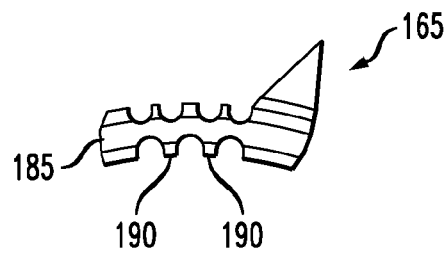
FIG. 2F shows an exploded side view of the hinge portion of the FIG. 1 securing apparatus.

The flexible connector 165 may comprise any kind of hinging device capable of allowing the securing apparatus 100 to expand to the extent required to apply it to the handlebar grip 125. In the illustrative embodiment, the flexible connector comprises a living hinge (sometimes called a "live hinge"). The design and function of living hinges will be familiar to one skilled in the art. A side view of the flexible connector is shown in FIG. 2F. It comprises a thin strap of flexible plastic 185 that spans between the edges of both rigid plates 160. A plurality of spines 190 on the flexible connector gives it extra strength. The spines also allow the flexible connector itself to be in contact with both the cylindrical surface 150 of the handlebar grip 125 and the tie-down strap 110 when the securing apparatus is in use. Any tendency to fold or buckle is thereby lessened.

The illustrative securing apparatus 100 in FIGS. 1 and 2A-2F is preferably made of plastic, but it may also be made of any other suitable material such as, but not limited to, rubber, leather, wood, or metal. If it is made of plastic, the rigid plates 160 and the flexible connector 165 may be formed integrally (i.e., as a single piece) by, for example, injection molding. Injection molding is typically an efficient and cost-effective way in which to product parts like the ones described herein. Such an injection molding process is conventionally performed and would be familiar to one skilled in the art. When forming the securing device, the rigid plates may, moreover, be formed with one or more uneven surfaces (e.g., pebbled surfaces). These uneven surfaces may provide even greater resistance to sliding between the securing apparatus and the handlebar grip 125 and/or the tie-down strap 110.

As shown in FIG. 1, the tie-down strap 110 sits between the two substantially parallel ridges 170 on each of the rigid plates 160. These ridges provide a barrier to the sideways movement of the tie down strap and thereby stop the tie-down strap from slipping or walking laterally while the motorcycle 105 is in transport. To further aid in restricting the lateral movement of the tie-down strap, the sidewalls 195 of these ridges that face the center of the securing apparatus 100 (i.e., the sidewalls that face the tie-down strap) preferably include portions that are substantially vertical relative to the uppermost surface of the rigid plates. These vertical sidewalls even further reduce the possibility that the tie-down strap will surmount the ridges.

Figure 3:
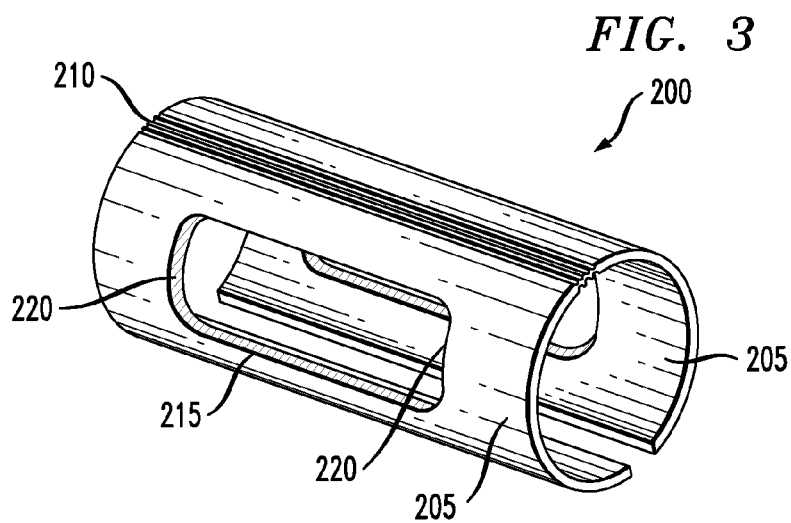
FIG. 3 shows a perspective view of a securing apparatus in accordance with a second illustrative embodiment of the invention.

Nevertheless, it should be noted that ridges are not the only manner in which to reduce the likelihood that the tie-down strap will slide laterally on the securing apparatus. FIG. 3 shows a perspective view of an additional securing apparatus 200 in accordance with a second illustrative embodiment of the invention. In a manner similar to the securing apparatus 100 in FIGS. 1 and 2A-2F, this second securing apparatus embodiment 200 comprises two rigid plates 205 connected at their edges by a flexible connector 210. However, instead of having ridges, each of the rigid plates defines a respective cutout 215. In this particular embodiment, the cutouts appear like rectangles with rounded corners, but other suitable shapes may also be utilized. When a tie-down trap is cinched down around the securing apparatus 200, a portion of the strap drops into the cutout region. The lateral edges of the cutouts 220 (i.e., the edges that are perpendicular to the long axis of the securing apparatus) thereafter provide a physical barrier to the lateral movement of the tie-down strap.

It should again be emphasized that the above-described embodiments of the invention are intended to be illustrative only. Other embodiments can use different types and arrangements of elements for implementing the described functionality. These other embodiments will be evident to one skilled in the art. For example, a securing apparatus in accordance with aspects of this invention need not only contain two rigid plates and one flexible connector. Instead, a securing apparatus may comprise a series of n rigid plates flexibly connected at their edges by (n−1) flexible connectors, where n is an integer greater than two. Like the two-plate illustrative embodiments described above, the series of n rigid plates connected at their edges will be adapted to be applied to a handlebar grip such that it overlies a majority of the cylindrical surface of that handlebar grip while also defining a gap between the first and last rigid plates in the series.

Figure 4:
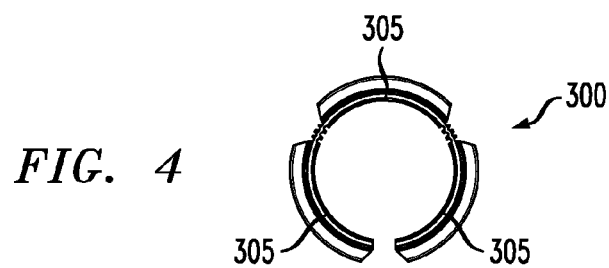
FIG. 4 shows an end view of a securing apparatus in accordance with a third illustrative embodiment of the invention.

FIG. 4, for example, shows an end view of an illustrative securing apparatus 300 having three rigid plates 305.

Figure 5:
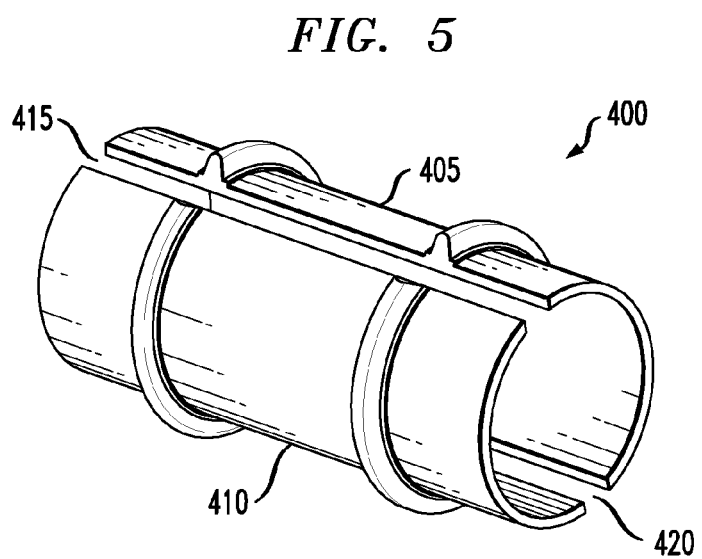
FIG. 5 shows a perspective view of a securing apparatus in accordance with a fourth illustrative embodiment of the invention.

In addition, alternative embodiments in accordance with aspects of the invention may implement a securing apparatus which comprises two or more rigid plates that are not attached to each other by flexible connectors, but are, in contrast, discrete elements. Such an alternative embodiment 400 with two rigid plates 405, 410 is shown in FIG. 5. Here, the two rigid plates are adapted so that they can be applied to the handlebar grip while defining two gaps 415, 420 between them. As before, the purpose of the gaps is to give the ridged plates room to constrict around the cylindrical surface of the handlebar grip under compression from a tie-down strap.

Finally, all the features disclosed herein may be replaced by alternative features serving the same, equivalent, or similar purpose, unless expressly stated otherwise. Thus, unless expressly stated otherwise, each features disclosed is one example only of a generic series of equivalent or similar features.

What is claimed is:

1. An apparatus for securing a vehicle for transport with a tie-down strap, the vehicle having a handlebar grip comprising a cylindrical surface, and the apparatus comprising a series of two or more rigid plates flexibly connected at edges thereof by one or more living hinges, wherein the series is adapted to be applied to the handlebar grip such that the two or more rigid plates overlie respective portions of the cylindrical surface while, at the same time, the first and last rigid plates in the series define an uncovered region of the cylindrical surface therebetween and the one or more living hinges are substantially contained between the two or more rigid plates so as not to substantially protrude above them.

2. The apparatus of claim 1, wherein at least one of the two or more rigid plates comprises a pair of raised ridge features that are raised above a common surface and run substantially parallel with one another.

3. The apparatus of claim 2, wherein each of the raised ridge features comprises at least one sidewall having a substantially vertical portion.

4. The apparatus of claim 1, wherein at least one of the two or more rigid plates defines an internal cutout that is totally enclosed by the rigid plate.

5. The apparatus of claim 1, wherein the apparatus comprises two rigid plates.

6. The apparatus of claim 1, wherein the apparatus comprises more than two rigid plates.

7. The apparatus of claim 1, wherein the two or more rigid plates are curved so as to substantially follow the contour of the cylindrical surface.

8. The apparatus of claim 1, wherein the two more rigid plates are curved with a radius of curvature of between about 0.5 inches and about 0.7 inches.

9. The apparatus of claim 1, wherein the two or more rigid plates comprise plastic, rubber, leather, wood, or metal.

10. The apparatus of claim 1, wherein the series is formed integrally by injection molding.

11. The apparatus of claim 1, wherein at least one of the two or more rigid plates comprises a surface portion that is pebbled.

12. The apparatus of claim 1, wherein the cylindrical surface comprises rubber.

13. The apparatus of claim 1, wherein the vehicle comprises a motorcycle, trike, bicycle, jet ski, snowmobile, or all-terrain vehicle.

* * * * *